United States Patent
Gnaedig et al.

(10) Patent No.: US 6,313,931 B1
(45) Date of Patent: Nov. 6, 2001

(54) SCREEN FOR LASER REAR PROJECTION

(75) Inventors: Klaus Gnaedig, deceased, late of Munich, by Zora Gnaedig, legal representative; Guenther Dausmann, Erding; Thorstein Halldorsson, Munich, all of (DE)

(73) Assignees: DaimlerChrysler AG, Stuttgart; HSM Holographic Systems Muenchen GmbH, Ottersberg, both of (DE)

( * ) Notice: Subject to any disclaimer, the term of this patent is extended or adjusted under 35 U.S.C. 154(b) by 0 days.

(21) Appl. No.: 09/355,648
(22) PCT Filed: Jan. 13, 1998
(86) PCT No.: PCT/EP98/00135
§ 371 Date: Jan. 13, 2000
§ 102(e) Date: Jan. 13, 2000
(87) PCT Pub. No.: WO98/34135
PCT Pub. Date: Aug. 6, 1998

(30) Foreign Application Priority Data

Jan. 31, 1997 (DE) .............................. 197 03 592

(51) Int. Cl.[7] ..................................... G02B 5/32
(52) U.S. Cl. .............. 359/15; 359/13; 359/443; 359/460
(58) Field of Search .................. 359/1, 13, 15, 359/443, 453, 460

(56) References Cited

U.S. PATENT DOCUMENTS

| 4,610,499 |   | 9/1986  | Chern et al. .            |
|-----------|---|---------|---------------------------|
| 4,984,856 |   | 1/1991  | Moss et al. .             |
| 5,715,083 | * | 2/1998  | Takayama ........... 359/443 |
| 5,796,499 | * | 8/1998  | Wenyon ............... 359/15 |
| 6,163,390 | * | 12/2000 | Kanda et al. ........... 359/1 |

FOREIGN PATENT DOCUMENTS

| 34 19 098 | 11/1995 | (DE) . |
| 0 349 884 | 1/1990  | (EP) . |
| 0 349 947 | 1/1990  | (EP) . |
| 2640772   | 6/1990  | (FR) . |
| 2699289   | 8/1994  | (FR) . |

* cited by examiner

*Primary Examiner*—Darren Schuberg
(74) *Attorney, Agent, or Firm*—Crowell & Moring LLP

(57) ABSTRACT

The invention concerns a holographic screen for the laser back-projection of at least one or a plurality of laser wavelengths, said holographic screen selectively and diffusely front-scattering the incident narrow-band laser radiation in a predetermined solid angle and simultaneously allowing through the disruptive spectrally broad-band ambient light from the observation area. To that end, the holographic screen comprises at least one holographic transmission grid which is coupled to a light absorber.

46 Claims, 6 Drawing Sheets

SCREEN FOR LASER REAR PROJECTION

BACKGROUND AND SUMMARY OF THE INVENTION

The invention relates to a screen for laser rear projection which, selectively for one or several laser wavelengths, forward-scatters the incident, narrow-band laser radiation in a previously determined solid angle but simultaneously highly absorbs the stray broad-band ambient light.

The necessity of visualizing information is currently increasing enormously. For display technology, therefore, this opens up a market with many segments, high sales, and high growth rates. In the functional chain composed of image recording, transmission, and processing of information, considerable progress has been made in recent years. However, the quality of current display methods is no longer adequate for this high state of development. The displays in use today such as cathode ray tubes and liquid crystal displays are limited in their potential for improvement.

Laser display technology, in other words the sequential buildup of images by laser beam deflection without screen afterglow, offers an inherent potential for producing high-quality images. The image information is modulated serially with electro-optical or acousto-optical modulators suitable to the laser beam. The beam is deflected by mechanical mirror scanners, similar to conventional television tubes, linewise over the image surface. Laser sources are being developed by several projector manufacturers as a replacement for thermal radiators such as halogen lamps and discharge lamps in conventional light valve projectors with liquid crystal or micro-mirror matrices.

Basically, thermal radiators are limited in their brightness by their internal operating temperature (black-body radiation). The spectral distribution of the basic colors red, green, and blue (RGB) can be optimized only by appropriate filtration and intensity matching. In addition, a lamp of this kind radiates uniformly in all directions. Despite a rear mirror, only a portion of the total radiation is available for radiation in a particular projection direction.

On the other hand, with a laser any beam power can theoretically be produced and is available in a closely bundled beam with almost zero losses. In addition, as a result of the narrow spectral bandwidth, its power can be converted completely for the required basic color. In recent years, semiconductor lasers and solid-state lasers have been developed with a much higher efficiency (lumens per watt) and a much longer lifetime (more than 50,000 hours) than with conventional lamps.

The theoretical suitability of laser beams for display technology was recognized early on. Hitachi demonstrated color television large projection in 1970. General Electric, Texas Instruments, General Telephone and Electronic Labs, and others demonstrated similar systems in the 1970s. At that time, however, the available lasers (gas lasers) had a lower efficiency, were bulky, and were unsuited for economical mass production.

As a result of the clear technological advances in the development of laser sources, image modulators, and image scanners, completely new technical and economic opportunities are available today for laser display technology:

the possibility of creating the suitable basic colors, red, green, and blue, with high efficiency;

a very high quality of projection as regards brightness, contrast, and resolution, and manufacturing economics by miniaturization and functional integration.

The laser is a coherent, monochromatically bundled light source. Any required beam density can theoretically be created. In addition, as a result of the narrow bandwidth of its power, the latter can be completely converted for the necessary basic color. With sequential pointwise image creation on the screen, the image is sharp at any distance and can be projected on sloping and curved surfaces as well.

With all the projectors, an image can basically be generated in two ways on the screen: by front projection and by rear projection. In the former case, the image is cast on the surface of the screen on which it is viewed. In this case, the screen must diffusely backscatter the incident light as much as possible. In the latter case, the image is projected on the opposite side of the screen (from the rear). In this case, the screen should allow the light to pass through as completely as possible, but at the same time must forward-scatter over a greater angle. The invention relates exclusively to this second method, rear projection.

Screens for rear projection with conventional image projectors (beamers) are commercially available in different sizes with different screen materials. The screen scatters the light beams directed at every image point on the rear by scattering at the surface or also by multiple scattering in the interior of a thin layer of the material. In this way, the image point on the viewing side is radiated outward diffusely from the screen as an expanded beam bundle. This phenomenon is well known for example from matte disks that are also used in the viewfinders of cameras.

Since the scattering of the light at the surface or within the image material results not only in the light being conducted farther in the forward direction but also to a certain extent in a backscattering of light from the projection surface, this light transmission is always subject to losses. A second disadvantage of these screens is that bright light from the viewing area also enters the screen and is not only conducted through the screen but is also backscattered to a certain degree. As a result, the screen always appears bright in an illuminated room, depending on the ratio of the forward-scattering intensity to the backscattering intensity, in various levels of gray.

In order to compensate for these losses and to reduce the brightness of the screen, so-called lenticular images or lenticular walls are frequently employed. With a fine lenticular pattern on the light exit surface to the viewer, the angle of forward scattering is narrowed. As a result, the image can be seen only in a narrow range of angles around the normal and brightened. At the same time, the recording angle of the projection wall for lateral stray light, for example originating from the lateral illumination of the room, which is directed toward the viewer, is reduced. All in all, these screens, despite illumination from the viewing area, appear darker and at the same time produce a brighter image. Of course, large screens of the latter type are very expensive to manufacture. However since they offer only limited improvements, projection can take place with the desired quality only in half-darkened rooms but not in bright rooms or in daylight.

In the case of front projection onto screens, the backscattering coating of the screen is designed so that the light from the projector is backscattered by this screen in a limited image angle, with the same advantage as in improved rear projection screens.

One major advantage of using lasers for projection is that, as a result of the resultant higher possible beam density by comparison with other light sources, the brightness of the image on the screen can be definitely increased. However, this advantage can be utilized only to a limited extent to increase image quality because in this case the same is true as in television technology: only by creating the image on a black screen can the image contrast be inherently created by the device, as well as the color saturation be transmitted undistorted to the viewer. This is because the minimum contrast perceived by the eye is proportional to the basic brightness of the image (Weber-Fechner Law), in other words the higher the brightness, the lower the perceptible contrast.

In color reproduction in bright rooms, the usually gray or white basic brightness of the screen is added to the color valence produced by the projector, and so the saturation of the color hues of the entire image changes at the same time that the contrast decreases.

This problem of high-quality image reproduction of contrast and color in bright rooms occurs both in front projection and in rear projection. The invention relates exclusively to the second method of rear projection, in other words the reproduction of the image conducted through screen and the design and manufacture of such screen for laser projection.

The measure already explained for increasing image brightness on the screen by narrowing the radiation angle with simultaneous suppression of ambient light, that makes the screen appear gray, also improves contrast and color reproduction. The darker the screen, the better the reproduction.

In color television technology with phosphorescent cathode ray tubes, this has been achieved by using gray glass in the image tube and with the aid of so-called "black matrix" screens. The glass layer of the gray glass damps the light passing through it by one-half. The maximum image brightness is reduced accordingly. Ambient light that strikes the white-reflecting phosphor layer behind the gray glass and thus brightens the image field must pass through the glass twice and is therefore reduced to 25 percent. As a result, a doubling of the contrast advantageously occurs. Another measure consists in applying a "black matrix" to the phosphor layer. The parts of the phosphor layer not used (spaces between the dots, landing reserve), as seen from the front, are covered by a black layer. In dark rooms, for example, today's cathode ray tubes supply contrast ratios of more than 1:200. In practical use however, the values are 1:40; see for example the book "Fernsehtechnik" [Television Technology," Hüttig-Verlag, Heidelberg, 1988.

By contrast, light valve projectors in dark rooms offer a contrast of 1:60 and in bright rooms, due to the scattering of the projection wall, only 1:6. In the large screens that are in wide use today, in which a plurality of cathode ray tubes arranged side by side in rows are projected onto a large rear projection screen, however, the contrast gain of the "black matrix" screen is lost once more.

By comparison to other projection methods, laser projectors have a very high primary contrast of 1:300. Therefore, in semi-dark rooms, this permits a much better reproduction than with conventional projectors. In very bright rooms, or in daylight, however, this inherent advantage no longer applies since the contrast in this case is also determined primarily by the scattering properties and the basic brightness of the screen.

The goal of the invention is to provide a rear projection screen, preferably for laser projectors, which diffusely forward-scatters the narrow-band laser light in one or more colors with high efficiency at a specific solid angle, but allows the broad-band ambient light from the viewing area to pass largely unimpeded and be fed to a light absorber.

The purpose of this projection screen according to the invention is to be able to cause large images, even with normal ambient illumination in bright rooms or in daylight, to stand out from the bright environment. Secondly, the contrast originally available in the device is also to be reproduced on the screen for the viewer. Thirdly, distortion of color by ambient light is to be minimized.

This goal is achieved according to the invention by a holographic screen. The object for recording this holographic screen is preferably an adapted screen that is preferably illuminated with all of the laser projection wavelengths employed in the hologram. During recording, care is taken to make sure that the screen is illuminated with the object beam so that its forward scattering characteristics remain the same as will be desired later during application. As the reference beam in the holographic recording, an expanded beam bundle is used that originates from a suitable location like the later projection beam. For reproduction in the case of a hologram, either an extensive beam as in recording or a point- or linewise-scanning beam can be used.

The hologram is preferably recorded as a so-called off-axis transmission hologram, in other words it is suited for viewing in transmitted light. Both "thin" and "thick" holograms can be used as screen holograms. The decision as to which type to use reflects the available recording materials, their cost, the degree of refraction desired, and the type of reproduction. With thick holograms, a high angular and wavelength selectivity can be achieved in particular during reproduction.

In the recording proposed here of a thin hologram in one step, the screen is illuminated as a two-dimensional lattice structure. The known recording geometry according to Leith and Upatniek is used, with a divergent reference beam. During reproduction with a projection beam that corresponds to the reference beam, the screen appears as a virtual image (in first-order diffraction) and can also be used directly as such. The stray light components in zero-th order diffraction and the other orders of diffraction are minimized and absorbed outside the hologram. As in other holograms of this kind, the image of the screen appears behind the hologram plate at the same location as during recording. Such holographic screens are suitable for many applications, for example for PC screens, in order to increase virtually the reading distance to the screen and thus facilitate accommodation of the eyes.

It is proposed for other applications to make the transmission hologram of a screen in two stages. The first step is the same as that described above. In this case, however, instead of the virtual image, the real image of the screen is used as the object for a second recording, and then optimized. This has the advantage that the position of the screen relative to the hologram plate during reproduction can be freely selected. For many applications, for example for video, television, or large projection, it is logical for this screen to be in the plane of the hologram. With this recording technique, it is also possible to allow the screen to project in front of the hologram, which is especially attractive for advertising purposes or for artistic image design.

A white holographic screen, as mentioned above, can be produced advantageously by recording a screen with all of the laser wavelengths used, for example red, green, and blue (RGB) in the same hologram. There are three different design possibilities in this case. In the first, three exposures of all the colors can be made in one recording layer. In the second, several layers of different spectral sensitivities, to which various laser wavelengths are adapted, can be stacked. In the third, the various recording materials can be arranged side by side, for example pointwise as an RGB triplet within each image point in a triangular arrangement, like the phosphors of a television delta shadow mask tube or as three adjacent vertical RGB strips, like the phosphors in the familiar television Trinitron tubes.

Recording holograms to be assigned to three different colors in a single thin layer, as proposed in the first alternative method, has the problem that each individual lattice structure also diffracts light of other wavelengths. In such a screen, with three-color projection, nine different scattering lobes in four different colors result, three of which coincide in a white lobe which then supplies the actual viewing light. The the other scattering lobes may be suppressed by measures provided later, such as lamellar structures.

In a stacked arrangement of the layers, for example, three different recording materials adapted to the colors can be used for example. By using three laterally arranged layers of various colors, the color crosstalk, as in the cathode ray tubes of a color television set, can also be suppressed.

The invention also provides that "thick" transmission holograms are used for screen recordings, primarily in applications in which a high selectivity of the hologram relative to the reproduction wavelength and irradiation direction is advantageous.

In thick holograms, during recording, a volume lattice is formed in the recording layer that is 5 to 30 microns thick as a rule. During reproduction, then, because of the interference between adjacent partial beams that are phase-shifted with respect to one another, the Bragg condition holds for the design interference. Consequently, a high diffraction efficiency for the recording wavelengths and the illumination direction of the reference beam is integrated into the screen and broad-band diffuse light as well as laser light passes through from the viewing side largely unimpeded; see for example the book "Holographie" by J. Eichler and G. Ackermann, Springer-Verlag, 1993.

As in a "thin" hologram, either a plurality of recordings of the screen with different colors can be recorded in the same hologram layer, in different layers arranged side by side or in rows, with adapted color sensitivity. The special advantages of the holographic screen with both thin and thick recording materials is its property to produce only an image of the originally diffusely scattering object screen in rear projection with the recording wavelengths for the viewer, but to allow the diffuse broad-band light from the viewing area to pass through almost unimpeded, where it is subsequently absorbed. The holograms can preferably be on a glass disk which preferably is provided with a coating for visible light.

To suppress the stray light of the zero-th and first orders, the invention provides additional holograms or diaphragm structures.

By incorporating additional optical elements into the beam path of the reference beam or of the object beam, the holographic image of the screen can be influenced. Thus, for example, the radiation angle of the holographic screen can be modified in elevation and azimuth with respect to the original screen, the brightness distribution over the screen can be set differently, and image errors in the projection optics can be improved later.

The manufacture of such a rear projector and holographic screen according to the invention is described above as an example. However, it can be accomplished in a number of different ways and in different steps that are known by and understood by the individual skilled in the art. The invention is described below in greater detail with reference to the embodiments shown partially schematically in the figures.

DETAILED DESCRIPTION OF THE DRAWINGS

Figure 1:
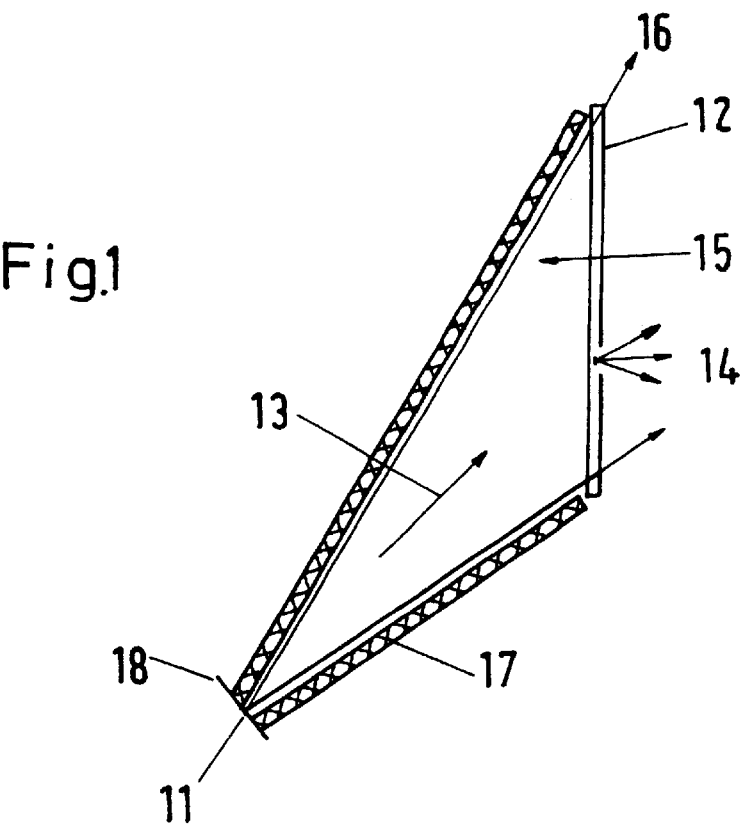
FIG. 1 shows a rear projector according to the invention with a transmission hologram and light trap.

FIG. 1 shows a cross section of a rear projector. The light from projector 11, which represents approximately a point light source, falls on the back of screen 12 and can be scanned pointwise or linewise for example, or can strike in a beam 13 that is expanded in a fixed manner. As a result of image modulation, the image is then written serially or in parallel depending on the projection method in all colors on the hologram surface, from where it is forward-scattered into the viewing area as diffuse light 14. Both hologram types, the thin and thick holograms, have the property of allowing the diffuse wide ambient light 15 from the viewing area as well as directed broad-band light from overhead lights for example to pass through almost unimpeded.

In order for the screen as a whole to appear as a black or dark area to the observer, as FIG. 1 shows, a light trap (absorber) 17 must be present that completely absorbs this stray light. Therefore, the hologram is preferably integrated as the front of a closed light-tight housing (as in a television set). A built-in light trap that closely surrounds the projection beam will efficiently absorb any light that does not travel along the beam cone between the projection location and the hologram. A certain amount of the ambient light, because of its inherent scatter function, will travel from the viewing area along the scattering cone to the projection location. By installing a pupil 18 at this location, this light can be prevented from traveling backward to the holographic screen.

A disadvantage of this arrangement is the amount of light of the zero-th order which occurs most strongly in thin holograms. This stray light 16, although it is much weaker in an efficient hologram than the useful beam, in the current beam direction emerges without deflection from the hologram. Since this beam cone also includes the image information, it can be used for various applications. As the stray light, the zero-th order together with the weak components of the first order can be absorbed by careful masking.

Figure 2:
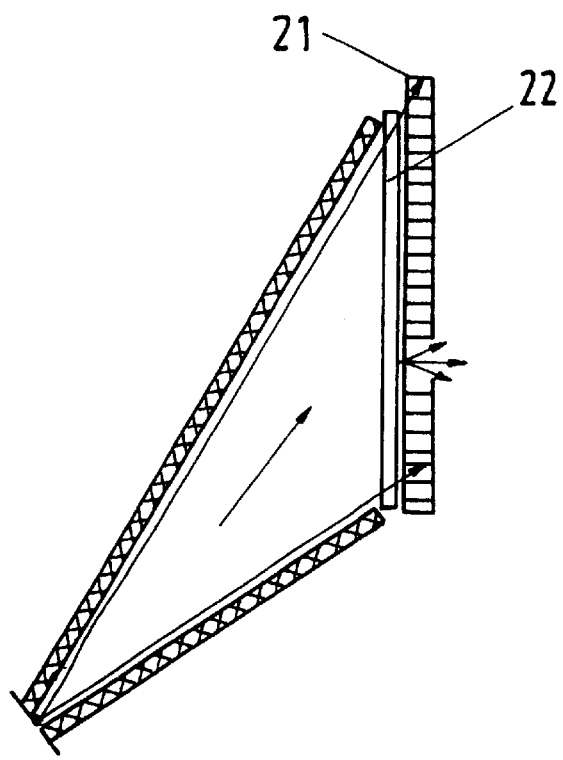
FIG. 2 shows a rear projector according to the invention with a transmission hologram, light trap, and lamellar diaphragm film for absorbing stray light.

This is indicated by the arrangement in FIG. 2, which in its other details corresponds to FIG. 1 with the exception of the addition of a lamellar film 21. In this case, a commercial lamellar film 21 is additionally applied over hologram 22 on the outlet side. This thin plastic film, which is transparent to visible light and is approximately 1 mm thick, is provided over its entire surface with fine lamellae with a structural size of approximately 100 microns. The lamellae are blackened and absorb every light beam starting at a certain inclination angle to the lamellar axis. Either lamellar structures that travel perpendicularly or those with a different inclination to the surface of the film are used. By a suitable design of the projection angle on the holographic screen, the thickness of the lamellar film, and the adjustment of the radiation lobe of the hologram, assurance can be provided that the useful light is largely conducted through in the plus-one order but the stray light components of the zero-th and minus-one order as well as higher orders are efficiently absorbed with a different propagation direction.

Figure 3:
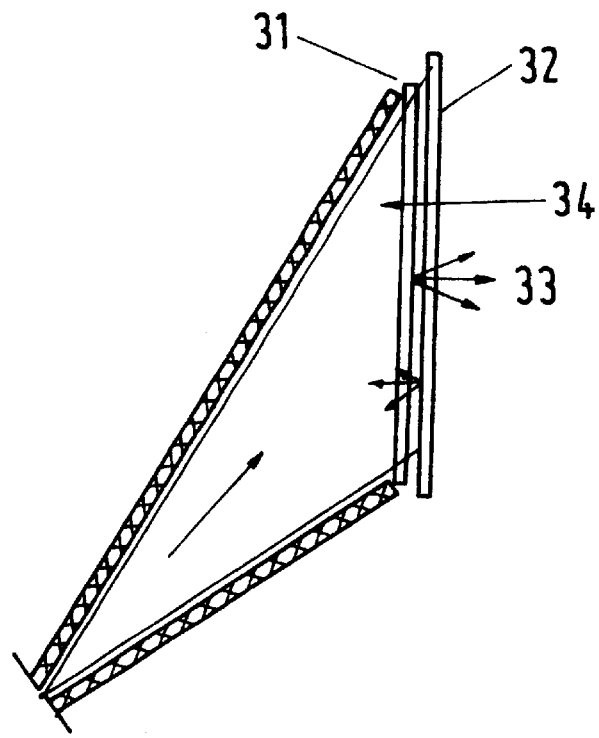
FIG. 3 shows a rear projector with a transmission hologram, light trap, and reflection hologram for rejecting stray light.
Figure 9:
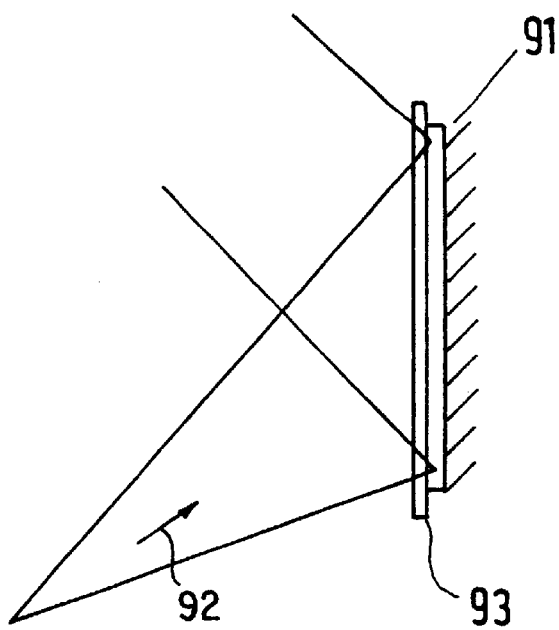
FIG. 9 shows the recording of an additional reflection hologram with the aid of a mirror.
Figure 10:
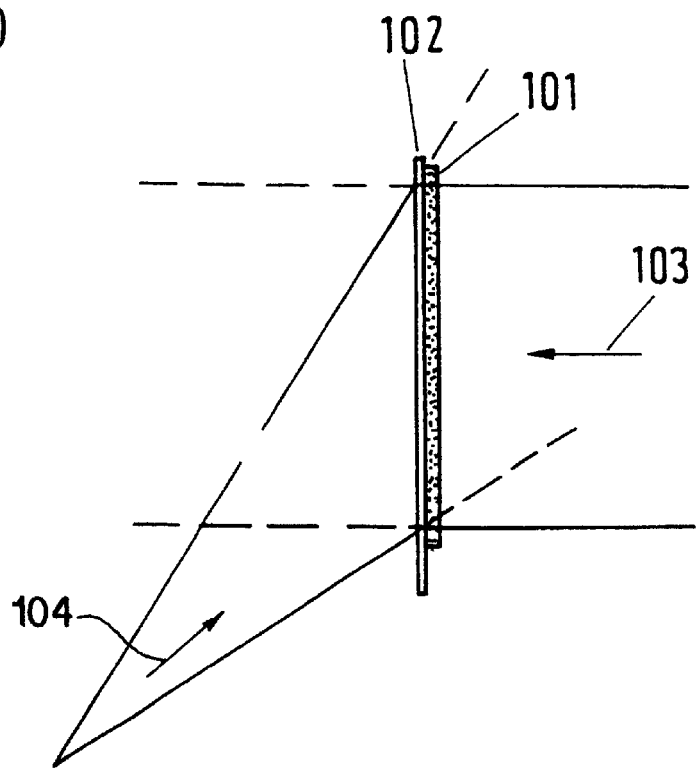
FIG. 10 shows the recording of an additional reflection hologram.

A second arrangement proposed by the invention is shown in FIG. 3, which corresponds in its other details to FIG. 1 except for the addition of a reflection hologram 32. In this case, in addition, the reflection hologram 32 is inserted into the beam path behind transmission hologram 31 in the direction of the viewer. This reflection hologram can be made for example as a selective holographic mirror which selectively reflects the wavelengths used and/or as, for example, a reflection hologram of the diffusely scattering screen which was already used for the transmission hologram but here, as a reflection hologram, rejects the light from the zero-th and minus-one order. Its manufacture is shown in FIG. 9 and FIG. 10 and described below. The reflection hologram which can be made only as a volume hologram with its particular selectivity of the irradiation direction is used here as a separating disk that backscatters all laser beams that proceed from the direction of the projection location (zero-th order) but allows those beams to pass through that have been deflected by the transmission hologram located in front (first order). Since these latter diffuse beams from the transmission hologram are distributed over a larger range of angles, care must be taken when designing the beam paths that the beam directions of this useful light are clearly set off from the beam direction of the zero-th order.

Figure 4:
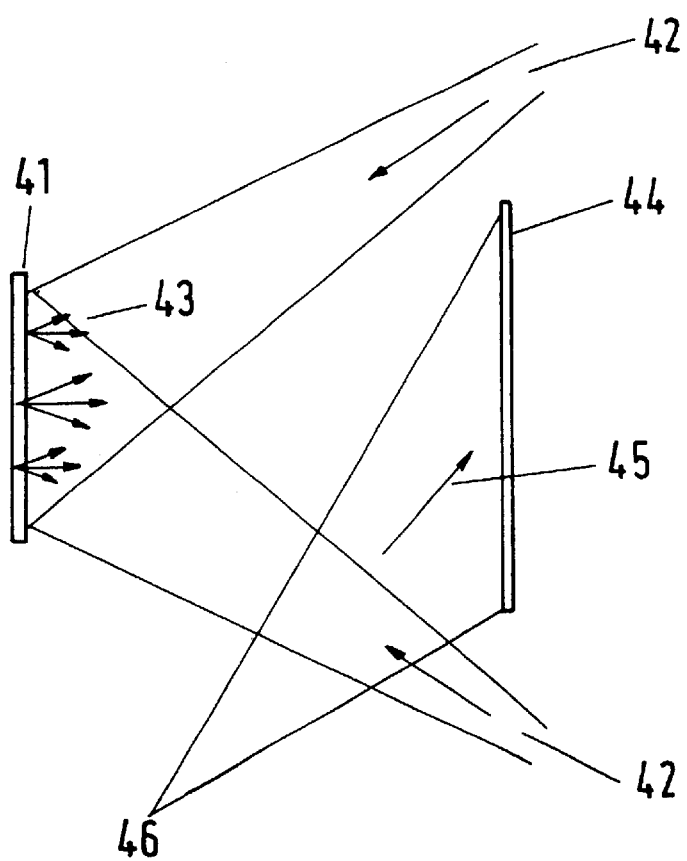
FIG. 4 shows the recording of a Leith-Upatniek off-axis hologram of the screen with a divergent reference beam.

FIG. 4 shows the recording according to the invention of the screen hologram in a design according to Leith and Upatniek. The object screen 41 in this case is illuminated by beams 42. The scattered light 43 originating in this screen illuminates the hologram. As a reference, a divergent reference beam 45 is used that departs from the same location 46 as the projection beam in reproduction. Following development of the hologram, it can be used directly as a virtual image of the screen, with the screen image appearing at the same location as the object screen.

Figure 5:
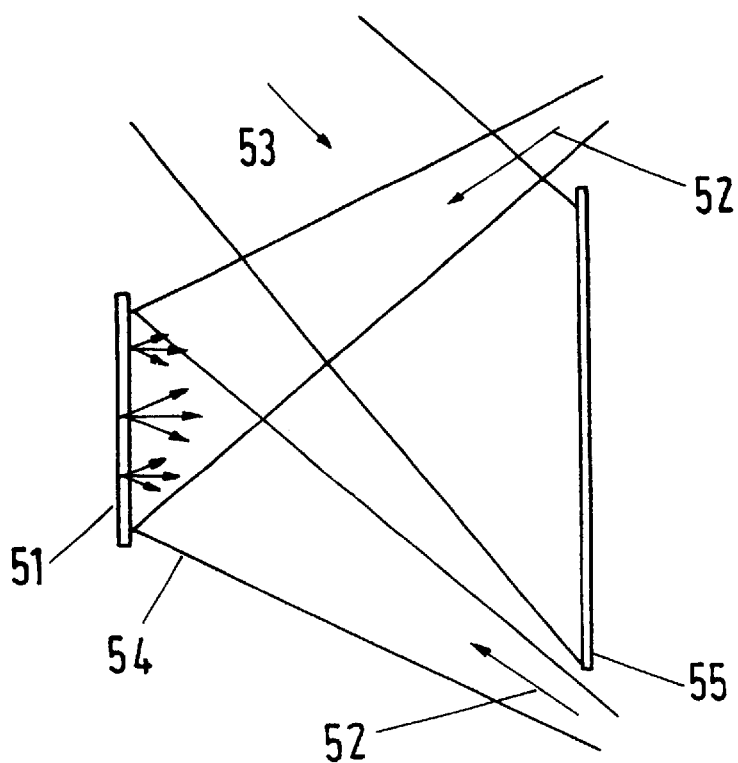
FIG. 5 shows the recording of a transmission master of the screen.

FIG. 5 shows the recording of a transmission master hologram of a diffusely backscattering screen 51 for a two-stage manufacturing process, for example with two illuminating beams 52. In this case, the reference light 53, as in the Leith-Upatniek method strikes hologram plate 55 from the same side as the scattered light of screen 54.

Figure 6:
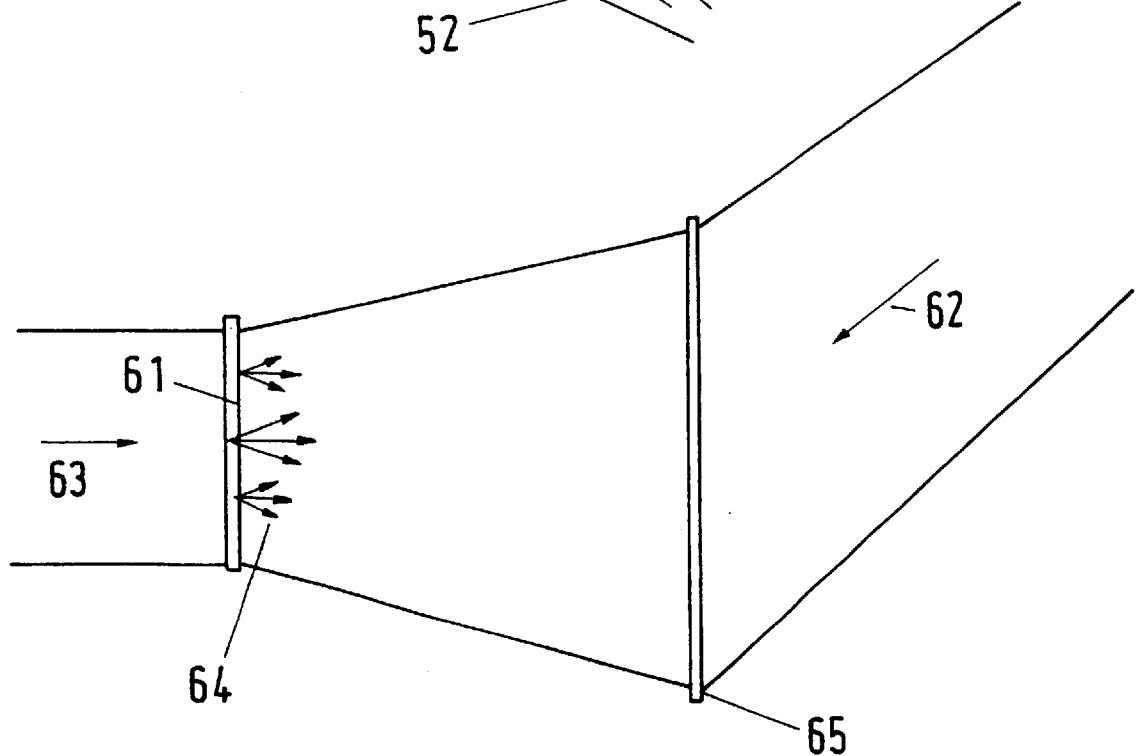
FIG. 6 shows the recording of a reflection master of the screen.

FIG. 6 shows the recording of a master hologram of a transparent screen 61 using reflection technology for a similar two-stage manufacturing method. In this case, reference light 62 strikes hologram plate 65 from the opposite side to the object light 64. In this case, screen 61 is preferably illuminated from behind, where there are for example advantages regarding system brightness and where corrective measures regarding scattered light distribution are readily possible.

Figure 7:
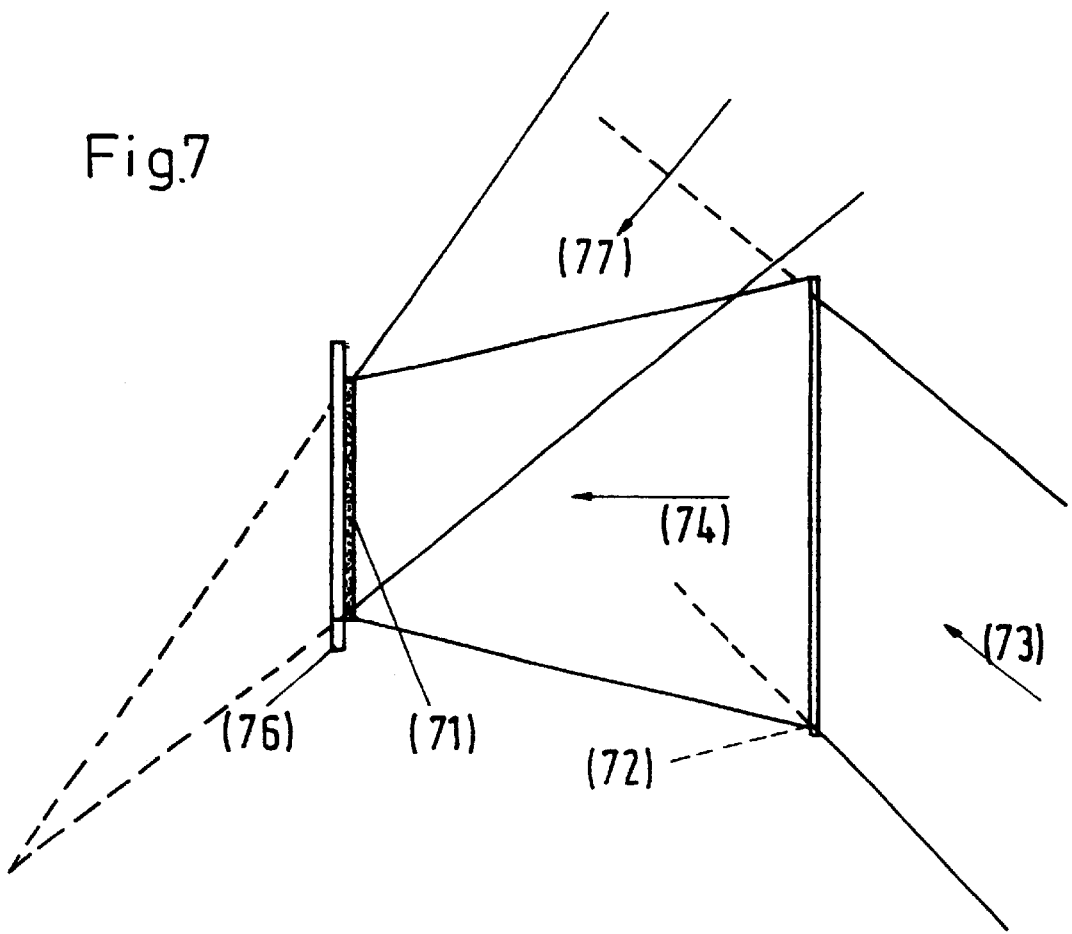
FIG. 7 shows the recording of a screen hologram of the transmission master.

FIG. 7 shows the "copying" of the transmission master into a holographic projection screen as an image plane hologram of the original screen. For this purpose, a real image of screen 71 is generated by the reconstruction beam 73 conjugate to the reference from the transmission hologram 72, and the holographic recording material 76 is placed at the location of the real image and additionally illuminated by a reference beam 77 which must correspond in its geometry to the later projection geometry, as already explained above.

Figure 8:
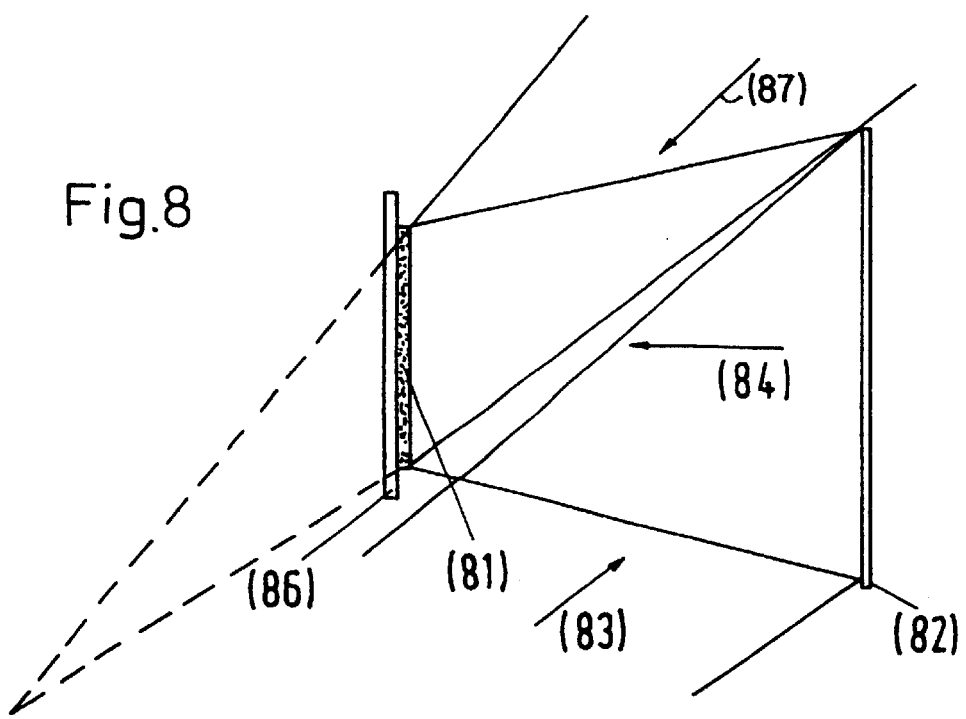
FIG. 8 shows the recording of a screen hologram of the reflection master.

FIG. 8 shows the similar process of copying when using a reflection master. For this purpose, once again, a real image of screen 81 is generated by the reconstruction beam 83 conjugate to the reference beam of the recording, and the holographic recording material 86 is placed at the location of the image and, in addition to this object light, is struck by a reference beam 87 which in turn must correspond in its geometry to the later reflection geometry.

FIG. 9 shows the holographic recording of a mirror 91 as an object that is used as an additional hologram in the system according to FIG. 3 in order to reject the zero-th order passing through the transmission hologram. Here, the direction of the reflection is determined by the adjustment of the incident angle of reference beam 92 relative to hologram plate 93.

As described above, this can preferably also be accomplished with the aid of a reflection hologram of the screen which, for example, has already been used to record the transmission hologram of the screen. FIG. 10 shows the recording of such a reflection hologram 102 of screen 101 that can be used as an additional hologram in the design according to FIG. 3. Preferably, a transparent scattering screen 101 is used here which is illuminated with transmitted light 103. The position of reference beam 104 is the same as later during image projection.

Figure 11:
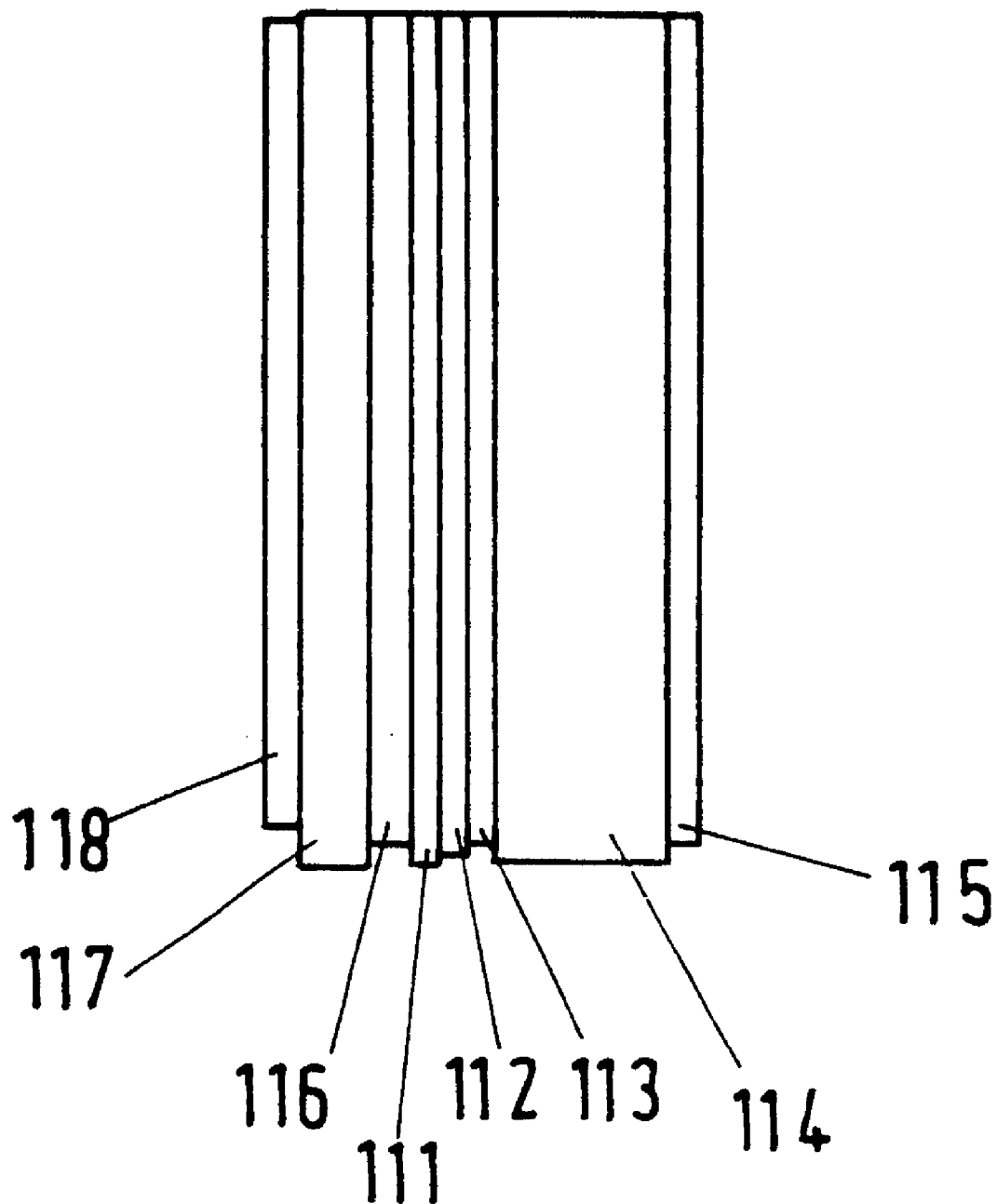
FIG. 11 shows a cross section through a sample finished holographic rear projection screen with three holographic recording layers for the colors red, green, and blue.

FIG. 11 shows a cross section through a finished holographic projection screen for the case of the example under discussion, with three recording layers being used for the colors red 111, green 112, and blue 113. The holographic screen is preferably a sandwich made of a transparent carrier layer 114, made of glass or acrylic glass for example, that is provided with a coating (antireflection layer) 115, with the holographic layers (111, 112, 113) arranged between the transparent carrier layer and a second transparent plate 117, possibly by a cement or intermediate layer 116 adapted for the refracted index. The second transparent plate 117 protects the hologram layers, and likewise is provided with a coating 118. The additional hologram for suppressing the zero-th order according to FIG. 1 can simultaneously be applied to the outer carrier plate or can also be made separately and then optically cemented to the first plate 114.

Instead of three different layers of three colors, a single holographic layer can be provided in which three lattice structures are deposited for three colors or other combinations of layers and colors. As described in detail above, the receiving surfaces associated with the individual colors can also be applied in triple dots laterally side by side, similarly to the color phosphors of television tubes, on a common carrier plate.

Silver halide material and photo resist are suitable receiving materials for "thin" holograms. Silver halide material, dichromate gelatins, or photopolymers are used preferably for "thick" holograms.

Refracting holographic lattice structures for the three basic colors can be manufactured basically with three lasers in these basic colors by simultaneous or successive elimination in one or several recording layers if subsequent further processing takes place in a manner that is faithful to color, in other words the reproducing wavelength of the holographic lattice after processing is equal to the receiving wavelength. However, if the layers shrink or swell during processing, the reproduction wavelengths will shift. As the individual skilled in the art knows, this can also be utilized to produce holographic lattice structures for different colors with illumination by only one laser wavelength, by previous or subsequent swelling or shrinking of the recording layers.

The location of the reference origin in the elimination of the holographic projection screen depends on the later desired location of the projector. Projection or scanning angles can differ depending on the application, for example 30° by 30° or 45° by 45°. Different azimuth and elevation angles can likewise be obtained. These geometric parameters are all incorporated into the recording geometry.

The radiation angle of the projection hologram of the screen can differ depending on the application, for example ±–10 degrees vertically and ±–45 degrees horizontally. These angles can be adjusted with the aid of additional optical elements in the beam path of either the reference or the object beam during recording, as already described above.

By incorporating additional optical elements into the beam path of the reference or object beam, the holographic image can likewise be influenced, for example in the brightness distribution of the reproduction or for deliberate correction of image errors in the projector.

The screen for holographic recording need not be flat. Curved screen surfaces as well as three-dimensionally shaped surfaces for special projections can be used, for example the surfaces of advertising pillars or plaster heads.

Instead of master holograms recorded by interference optics, computer-generated holograms or holograms generated from computer-generated holograms can be used as well, in which a specific scatter function is stored by computer. It follows from the above that the holographic screen according to the invention can be used for one or more laser lines. These laser lines need not necessarily lie in the visible spectrum, but when suitable recording materials are used can also be in the UV or IR range for recording images from technical sensors such as cameras, photodetectors, or photodetector arrays.

Although high requirements are usually imposed on the spectral narrow-band nature (time coherence) of the illumination source for screen recording during reproduction, both light sources with individual sharp spectral lines such as lasers or gas discharge lamps and filtered broad-band lamps such as halogen and incandescent lamps may be used.

What is claimed is:

1. Holographic screen for laser rear projection of at least one or more laser wavelengths, which selectively diffusely forward-scatters incident narrow-band laser radiation in a predetermined solid angle and simultaneously allows stray broad-band ambient light from a viewing area to pass through, wherein the screen has at least one holographic transmission lattice coupled to a light absorber and wherein a lamellar diaphragm film is placed in front of a transmission hologram in the direction of the viewer to absorb stray light from the transmission hologram and from a viewing area or said diaphragm film is placed in front of the transmission hologram in a direction of a projector wherein the film absorbs the stray light from the viewing area.

2. Holographic screen according to claim 1, wherein the screen further has at least one additional transparent carrier layer.

3. Holographic screen according to claim 1, wherein the screen further has at least one additional coating layer.

4. Holographic screen according to claim 1, wherein the screen further has at least one holographic surface lattice.

5. Holographic screen according to claim 1, wherein the screen further has at least one holographic volume lattice.

6. Holographic screen according to claim 1, wherein the screen further has three holographic surface lattices associated with three basic colors.

7. Holographic screen according to claim 1, wherein the screen further has three holographic volume lattices associated with three basic colors.

8. Holographic screen according to claim 7, wherein the screen contains the three holographic volume lattices in one layer.

9. Holographic screen according to claim 7, wherein the screen contains the three holographic volume lattices in several layers.

10. Holographic screen according to claim 1, wherein the screen has a plurality of combinations of holographic layers and associated basic colors.

11. Holographic screen according to claim 1, wherein the screen has at least one amplitude lattice or percentile amplitude lattice that completely or partly functions as the light absorber.

12. Holographic screen according to claim 1, wherein the light absorber, as a cavity absorber, surrounds in a light-tight fashion an area and beam path behind a projection surface on a transmission hologram up to an entrance opening of a projection beam on the hologram.

13. Holographic screen according to claim 1, wherein images are produced on the screen by serial pointwise scanning of a modulated image beam on the screen.

14. Holographic screen according to claim 1, wherein images are produced by parallel linewise scanning of a modulated image line on the screen.

15. Holographic screen according to claim 1, wherein images are produced on the screen by areawise fixed projection of an image matrix of a light valve modulator.

16. Holographic screen according to claim 1, wherein narrow-band LEDs instead of laser sources, are used as light sources in image recording.

17. Holographic screen according to claim 1, wherein a filtered broad-band light is used for image recording.

18. Method for manufacturing a holographic screen according to claim 1, wherein the hologram is recorded in one step as a Leith-Upatniek transmission hologram with a diffuse reflecting screen as the object and a divergent reference beam.

19. Method for manufacturing a holographic screen according to claim 1, wherein a master hologram is used in a two-stage method to produce the holographic screen.

20. Method for manufacturing a holographic screen according to claim 2, wherein the object is a diffusely reflecting screen by which a transmission master hologram is produced.

21. Method for manufacturing a holographic screen according to claim 3, wherein the object is a diffusely reflecting screen by which a transmission master hologram is produced.

22. Method for manufacturing a holographic screen according to claim 4, wherein the object is a diffusely reflecting screen by which a transmission master hologram is produced.

23. Method for manufacturing a holographic screen according to claim 19, wherein the object is a diffusely transmitting screen by which a transmission hologram or reflection master hologram is produced.

24. Method for manufacturing a holographic screen according to claim 19, wherein an image plane of the screen lies in a plane of the hologram during the recording of the screen hologram from the master hologram.

25. Method for manufacturing a holographic screen according to claim 20, wherein an image plane of the screen lies in a plane of the hologram during the recording of the screen hologram from the master hologram.

26. Method for manufacturing a holographic screen according to claim 23, wherein an image plane of the screen lies in a plane of the hologram during the recording of the screen hologram from the master hologram.

27. Method for manufacturing a holographic screen according to claim 19, wherein an image plane of this screen is located in front of a plane of the hologram during the recording of the screen hologram from the master hologram.

28. Method for manufacturing a holographic screen according to claim 20, wherein an image plane of this screen is located in front of a plane of the hologram during the recording of the screen hologram from the master hologram.

29. Method for manufacturing a holographic screen according to claim 23, wherein an image plane of this screen is located in front of a plane of the hologram during the recording of the screen hologram from the master hologram.

30. Method for manufacturing a holographic screen according to claim 19, wherein an image plane of the screen is located behind the plane of the hologram during the recording of the screen hologram from the master hologram.

31. Method for manufacturing a holographic screen according to claim 20, wherein an image plane of the screen is located behind the plane of the hologram during the recording of the screen hologram from the master hologram.

32. Method for manufacturing a holographic screen according to claim 23, wherein an image plane of the screen is located behind the plane of the hologram during the recording of the screen hologram from the master hologram.

33. Method for manufacturing a holographic screen according to claim 18, wherein a brightness distribution and image error are corrected in at least one of the recording steps by additional optical elements arranged in the beam path.

34. Method for manufacturing a holographic screen according to claim 19, wherein a brightness distribution and image error are corrected in at least one of the recording steps by additional optical elements arranged in the beam path.

35. Method for manufacturing a holographic screen according to claim 18, wherein optical elements are incorporated into a reference beam path which compensate image errors of a laser scanner.

36. Method for manufacturing a holographic screen according to claim 19, wherein optical elements are incorporated into a reference beam path which compensate image errors of a laser scanner.

37. Method for manufacturing a holographic screen according to claim 18, wherein optical elements are incorporated into a reference beam path that compensate image errors in an areawise projection of an image matrix.

38. Method for manufacturing a holographic screen according to claim 19, wherein optical elements are incorporated into a reference beam path that compensate image errors in an areawise projection of an image matrix.

39. Method for manufacturing a holographic screen according to claim 18, wherein a total scattered light distribution of the holographic screen is adjusted by multiple beam illumination of the screen.

40. Method for manufacturing a holographic screen according to claim 19, wherein a total scattered light distribution of the holographic screen is adjusted by multiple beam illumination of the screen.

41. Method for manufacturing a holographic screen according to claim 18, wherein a total scattered light distribution of the holographic screen is adjusted by additional optical elements in the screen illumination.

42. Method for manufacturing a holographic screen according to claim 19, wherein a total scattered light distribution of the holographic screen is adjusted by additional optical elements in the screen illumination.

43. Method for manufacturing a holographic screen according to claim 19, wherein a computer-generated hologram is used to produce the holographic screen.

44. Holographic screen for laser rear projection of at least one or more laser wavelengths, which selectively diffusely forward-scatters incident narrow-band laser radiation in a predetermined solid angle and simultaneously allows stray broad-band ambient light from a viewing area to pass through, wherein the screen has at least one holographic transmission lattice coupled to a light absorber, wherein a volume reflection hologram is placed in front of a transmission hologram in a direction of a viewer, the volume reflection hologram reflecting the stray light from the transmission hologram in the direction of the light absorber.

45. Holographic screen according to claim 44, wherein the volume reflection hologram is a holographic mirror that reflects the stray radiation in a directed fashion.

46. Holographic screen according to claim 44, wherein the reflection hologram is a reflector that diffusely reflects the stray radiation.

\* \* \* \* \*